June 19, 1945.  G. L. WERLING  2,378,454

PIPE AND TUBING GRIPPER

Filed June 26, 1944

INVENTOR.
GEORGE L. WERLING
BY
*Munn, Liddy & Haccum*
ATTORNEYS

Patented June 19, 1945

2,378,454

UNITED STATES PATENT OFFICE 2,378,454

PIPE AND TUBING GRIPPER

George L. Werling, Bakersfield, Calif.

Application June 26, 1944, Serial No. 542,195

2 Claims. (Cl. 294—15)

The present invention relates to improvements in a pipe and tubing gripper, and it consists of the combinations, constructions and arrangements hereinafter described and claimed.

An object of my invention is to provide a gripper of the type described and means of which a pipe, or a tube, can be conveniently gripped and lifted or pulled.

Another object of my invention is to provide a gripper of the type described which provides a firm and positive grip on the end of a pipe when a lifting force is exerted on said gripper, and which can be easily disengaged from the pipe.

A further object of my invention is to provide a gripper which is simple in construction, durable and efficient for the purpose intended.

Other objects and advantages will appear in the following specification, and the novel features of the device will be particularly pointed out in the appended claims.

My invention is illustrated in the accompanying drawing forming a part of this application, in which.

Figure 1:
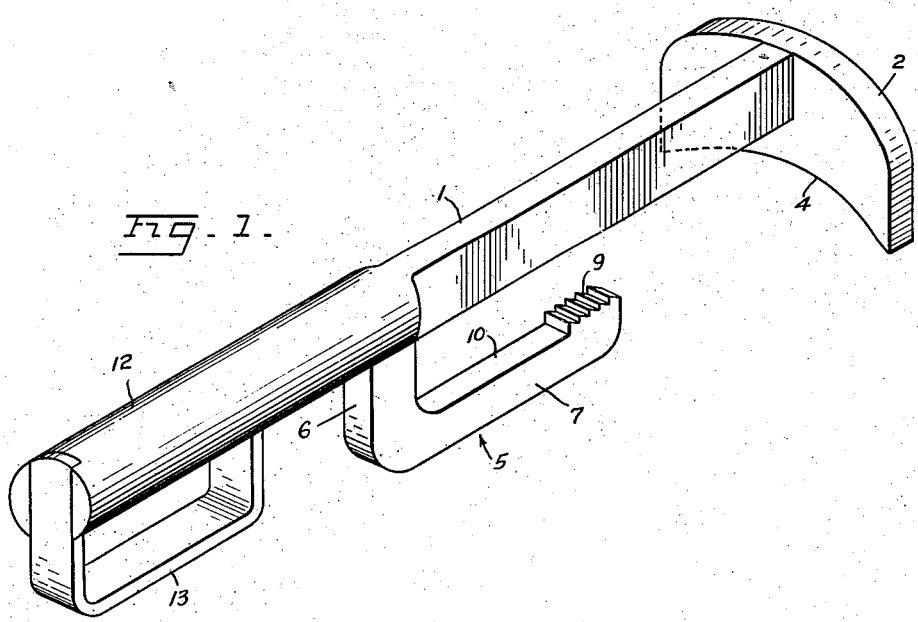
Figure 1 is a perspective view of the gripper.
Figure 2:
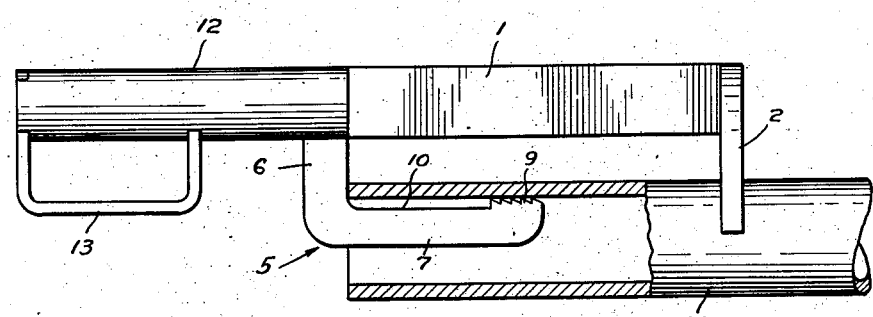
Figure 2 is a side elevation of the gripper, shown operatively applied to a pipe for lifting or pulling purposes.

While I have shown only the preferred forms of my invention, it should be understood that various changes or modifications may be made within the scope of the appended claims without departing from the spirit and scope of the invention.

In carrying out my invention, I provide a gripper having a shank 1, preferably made of metal, and the shank may be of various sizes and lengths, depending upon the size and weight of the pipes to be handled. One end of the shank 1 carries an upper jaw 2 securely attached to the shank by welding, brazing or the like. The jaw 2 has substantial thickness to provide a sufficient bearing surface at its lower concave edge 4.

A lower jaw 5 is also carried by the shank 1, which jaw in cooperation with the upper jaw 2 is adapted to grip a pipe in a manner hereinafter described. The lower jaw 5 is L-shaped in form and is firmly secured to the shank 1 at a point where the jaw will be removed from the concave jaw. The short leg 6 of the L-shaped jaw is welded or otherwise attached to said shank. The long leg 7 extends parallel with and in spaced relation from the shank 1 and toward the upper jaw 2. The leg 7 terminates with a plurality of serrations, or teeth 9 that are formed on the side 10 of the leg, facing the shank. It should be noted that the teeth 9 protrude above the side 10.

The other end of the shank 1 constitutes a handle 12 and has a U-shaped hand guard 13 attached to the shank.

From the foregoing description of the various parts of the device, the operation thereof may be readily understood.

The gripper is moved toward the end of a pipe 14 so that the upper jaw 2 slides on, or is above, the same, and the lower jaw 5 is inserted into the pipe. The gripper is continued in its forward movement until the end of the pipe 14 abuts the short leg 6 of the lower jaw 5, whereupon a lifting force may be applied to the handle 12. The lower jaw 5 is lifted until the teeth 9 contact with the inner surface of the pipe 14 and firmly engage the latter. Further lifting of the handle 12 creates sufficient leverage for the jaws 2 and 5 to exert a firm non-slip grip upon the pipe, which shall remain as long as the lifting force is applied on the handle 12.

During this time the pipe 14 can be lifted, pulled endwise, lowered or turned. The hand guard 13 prevents the hand of an operator from slipping off from the handle 12, when the pipe 14 is pulled endwise. The guard also prevents the hand from scraping against other pipe.

When the pipe gripper is used for handling thin wall tubing, or light metal tubing the teeth 9 could be covered by a piece of soft material, or rubber, to avoid injury to the tubing. The tool is designed primarily for moving fairly heavy pipe.

I claim:

1. A pipe gripper comprising a shank; a handle formed on one end of said shank; an upper jaw secured to the other end of said shank, said jaw having a concave lower portion adapted to rest on the outer surface of a pipe to be gripped; a lower jaw secured to said shank at a point intermediate the handle and the upper jaw, said lower jaw extending toward the upper jaw a certain distance and being spaced from the shank; and a plurality of teeth carried by the lower jaw for engaging with the inner surface of the pipe.

2. A pipe gripper comprising a handle having an integral shank aligned therewith and extending therefrom, an upper jaw secured to the free end of the shank and having a concave lower portion adapted to rest on the outer surface of a pipe to be gripped, a lower L-shaped jaw secured to the handle, one leg of the L paralleling the shank and extending toward the first jaw, the space between the lower jaw and the shank being adapted to receive a pipe portion therebetween, the side of the lower jaw leg paralleling the shank having raised teeth adjacent to the free end of the leg for engaging with the inner pipe surface when the handle is raised for lifting the pipe, said teeth being shaped for digging into the pipe when the handle is moved in the direction of the length of the pipe and away from the pipe with a slight lifting force, whereby the gripper will move the pipe in the direction of its length.

GEORGE L. WERLING.